(12) United States Patent
Kim

(10) Patent No.: US 8,581,953 B2
(45) Date of Patent: Nov. 12, 2013

(54) METHOD AND APPARATUS FOR PROVIDING ANIMATION EFFECT ON VIDEO TELEPHONY CALL

(75) Inventor: Jung Mo Kim, Busan (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 566 days.

(21) Appl. No.: 12/628,291

(22) Filed: Dec. 1, 2009

(65) Prior Publication Data

US 2010/0134588 A1    Jun. 3, 2010

(30) Foreign Application Priority Data

Dec. 1, 2008  (KR) .................. 10-2008-0120675

(51) Int. Cl.
*H04N 7/14*          (2006.01)
(52) U.S. Cl.
USPC .................................... 348/14.01; 348/14.02

(58) Field of Classification Search
USPC .......... 348/14.01, 14.08, 14.16, 14.02, 14.07
See application file for complete search history.

(56) References Cited

U.S. PATENT DOCUMENTS

| 2007/0139512 A1* | 6/2007 | Hada et al. ................. 348/14.01 |
| 2008/0158334 A1* | 7/2008 | Reponen et al. ........... 348/14.02 |
| 2009/0051753 A1* | 2/2009 | Lin et al. .................... 348/14.02 |

* cited by examiner

*Primary Examiner* — Quoc D Tran
(74) *Attorney, Agent, or Firm* — Cha & Reiter, LLC

(57) ABSTRACT

Provided is a method and apparatus that can obtain face state information of corresponding video data through the face recognition processing for at least one video data among a user video data and another party's video data during a video telephony call, and extract various event data corresponding to a face state information to be output in conjunction with the video data. The face state information is provided using a face recognition process.

27 Claims, 7 Drawing Sheets

METHOD AND APPARATUS FOR PROVIDING ANIMATION EFFECT ON VIDEO TELEPHONY CALL

CLAIM OF PRIORITY

This application claims the benefit of the earlier filing date, pursuant to 35 USC 119, to that patent application entitled "METHOD AND APPARATUS FOR PROVIDING ANIMATION EFFECT ON VIDEO TELEPHONY CALL" filed in the Korean Intellectual Property Office on Dec. 1, 2008 and assigned Serial No. 10-2008-0120675, the contents of which are incorporated herein by reference.

BACKGROUND OF THE INVENTION

1. Field of the Invention

The present invention relates to video telephony (VT), and more particularly, to a method and apparatus for providing animation effects during a video telephony call in the mobile terminal.

2. Description of the Related Art

With the rapid development of the communications technology, various user interface (UI) functions have been provided as the functions of a mobile terminal other party has gradually expanded. According to recent trends, the communications method available for voice, image, data communications have achieved significant development, and the methods capable of providing high-speed multimedia service has been continuously studied. Recently, video telephony calling has been introduced to users. However, the introduced video telephony calling is not merely a telephone call using only a simple voice. Rather this technology allows a user to talk over the telephone while looking at the display of the other party while other functions may be provided for the user's convenience. Such video telephony calling is performed by simultaneously transmitting video data inputted through a camera with audio data inputted through a microphone. This video telephony calling uses the real time video streaming technology and transmits video data to the other party, so that both users can talk over the telephone while looking at the display of other party. Moreover, the number of users who use the video telephony calling is gradually increased as third-generation wireless services are distributed. Therefore, additional services according to the usage of video telephony calling are desired by users. Thus, the necessities of additional services in the mobile terminal that can induce the interest of user during the video telephony call are emerging.

SUMMARY OF THE INVENTION

The present invention further provides a method and apparatus which can recognize the face of a user and other party displayed on a screen during video telephony call in a mobile terminal, and express various animations according to a determined face state information of either the user or the other party by combining with video data of the user and/or the other party.

The present invention further provides a method and apparatus which can obtain face state information of a corresponding video data through a face recognition process for at least one video data among user video data and other party video data during the video telephony call in the mobile terminal, and extract various event data corresponding to the face state information to output with the video data.

In accordance with an aspect of the present invention, a video telephony call method includes: determining a preset event mode when event execution is sensed during a video telephony call; performing a face recognition processing for specific video data in response to the event mode; obtaining state information of video data by the face recognition processing; and outputting event data according to the state information on the video data.

In accordance with another aspect of the present invention, a mobile terminal that supports a video telephony call includes: a wireless communication unit which forms a communication channel having a preset protocol with a mobile communication network that supports a video telephony call, and processes transmission and reception of data according to the video telephony call; a camera module that photographs an image of a user and outputs a user video data associated with the photographed image during the video telephony call; a display unit that displays at least one of the user video data and another party's video data on divided display areas during the video telephony call; a storage unit that stores event data classified into a feeling item and an accessory item and various setting information of event mode; and a controller that controls a face recognition processing for at least one video data obtained during the video telephony call, and controls an output of specific event data on a corresponding video data according to the face recognition processing.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
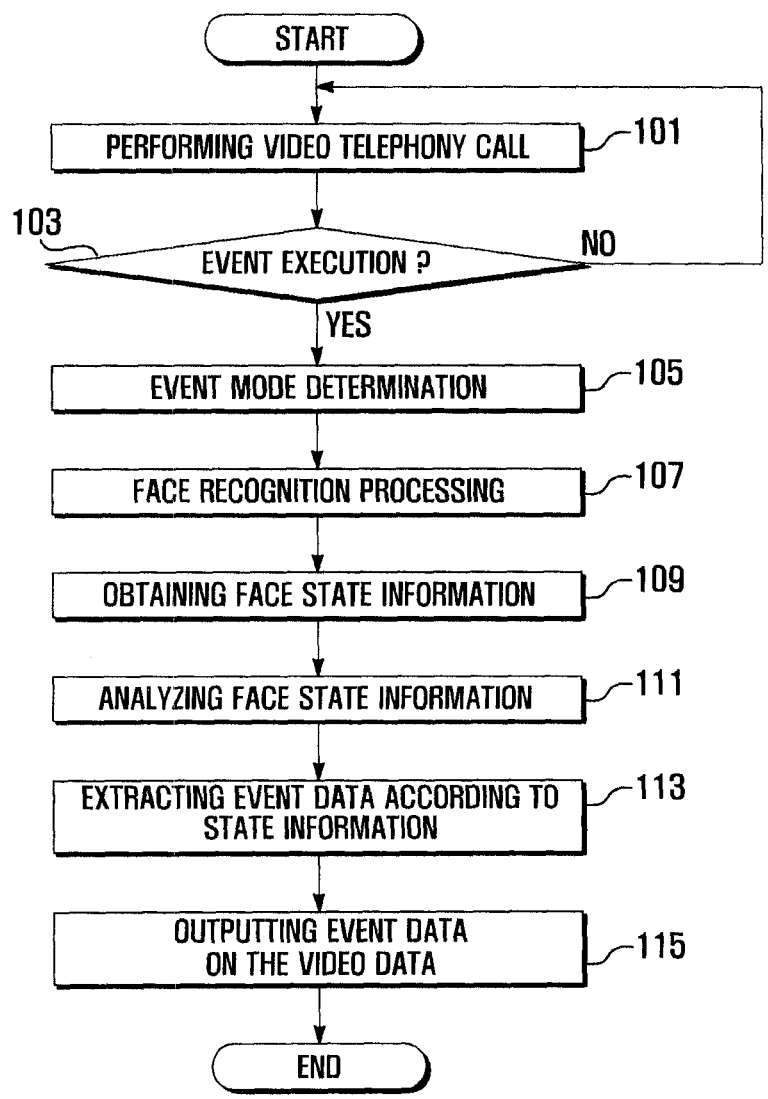
FIG. 1 is a flowchart illustrating an operation of outputting an animation effect during video telephony call according to an exemplary embodiment of the present invention.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

The present invention relates to a mobile terminal that supports a video telephony (VT) call function. Particularly, in an embodiment of the present invention, various animation effects according to the user's desire can be reflected onto video data that is obtained and displayed during the video telephony call.

The present invention relates to a method and apparatus for providing an animation effect during the video telephony call, which can obtain face state information of corresponding video data through face recognition processing for at least one video data among a user's video data and the other party's video data during the video telephony call, and extract various event data corresponding to the face state information that may be output along with the video data.

In the embodiment of the present invention, the video data includes video data of the mobile terminal user and video data of the other party mobile user. That is, it includes video data of the user that the mobile terminal obtains through a camera module during the video telephony call and video data of the other party obtained through a communications unit. In the embodiment of the present invention, the video data can be classified into face data and background data. A detailed description of video data is described later.

In the embodiment of the present invention, the animation effect means that various types of animation data (event data) are reflected onto the video data on a real-time basis. The animation data can be applied to one or each data among the face data and the background data according to user's selection among the video data.

In the embodiment of the present invention, for the operation of the present invention, the visage recognition or, face recognition technology can be applied and used. Generally, the visage recognition (face recognition) technology indicates the technology that automatically renders the face of a user through a digital image. It can be performed by comparing the facial characteristics indicated in the video data that is obtained through camera module or a communications unit (e.g., a wireless communication unit) with a visage (face) database, which may have been previously implemented. Such visage recognition (face recognition) technology is a publicly well known technology and hence, detailed description of the face recognition technology is not discussed herein.

According to an embodiment of the present invention, various modes (event mode) for the function execution of the present invention is set up, and setting information, various event data and state information of a face related with each mode used in the present invention and can be stored in a memory or database within, for example, a mobile terminal.

The event mode applied in the present invention, the setting information according to the event mode, the event data and the state information will be described with reference to Table 1 and Table 2. Moreover, for the convenience of illustration, Table 1 and Table 2 will be described with reference to attached drawings including FIGS. 6a to 6c.

Figure 6A:
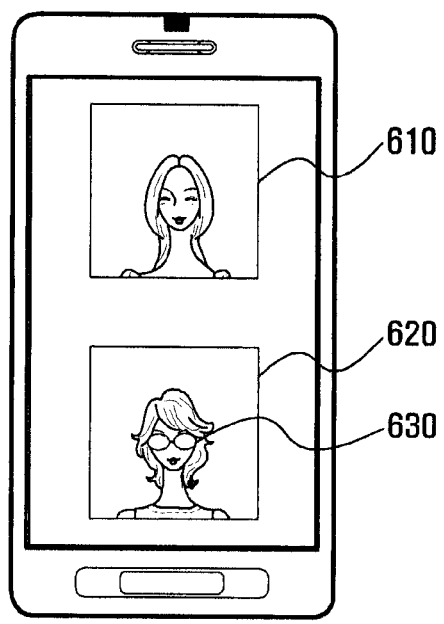
FIGS. 6a to 6c are drawings illustrating examples of display screens in which event data is outputted according to an exemplary embodiment of the present invention.
Figure 6B:
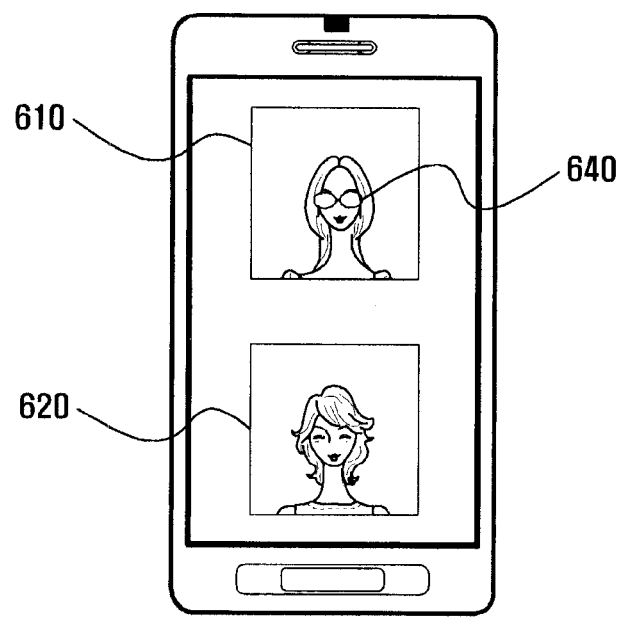
Figure 6C:
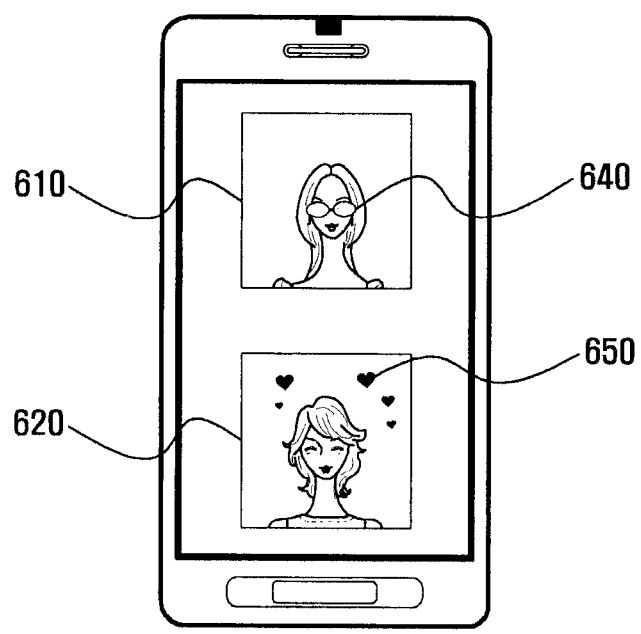

FIGS. 6a to 6c are drawings illustrating screen examples in which event data is outputted along with video data in a mobile terminal according to an exemplary embodiment of the present invention.

Referring to FIGS. 6a to 6c, FIG. 6a illustrates an example of a screen 610 that outputs a specific event data onto the video data of a user, particularly, face data, during a video telephony call. FIG. 6b illustrates an example of screen 620 that outputs a specific event data onto the video data of the other party, particularly, face data, during the video telephony call. FIG. 6c illustrates an example of a screen that outputs a corresponding specific event data along with video data of the other party, particularly, face data, and the video data of user, and animated background data 650, during the video telephony call.

The present invention will be described with reference to Table 1 and Table 2 and FIGS. 6a to 6c.

TABLE 1

| Event mode | Setting |
|---|---|
| Selection mode | User video data |
| | Other party video data |
| | All video data |
| Application mode | Face data |
| | Background data |
| | All partial video data |

As shown in Table 1, the event mode of the present invention can be classified into a selection mode and an application mode.

The selection mode indicates the mode that sets up video data that introduces animation effect. In the selection mode, a user can designate video data that provides the animation effect. According to the setting of the selection mode, the mobile terminal can partition the display area into areas (610, 620) in which video data are displayed, and can perform the face recognition processing for video data of a corresponding display areas (610, 620).

For example, as shown in FIGS. 6a to 6c, the display area of the display unit in the video telephony call can be classified into the other party display area 610 which displays video data of the other party and a user display area 620 that displays video data of the user. Accordingly, when a user video data item is set in the selection mode of Table 1, the mobile terminal can perform the face recognition processing with respect to the video data of the user displayed in the user display area 620 according to the event execution of the present invention. Moreover, when the other party video data item is set in the selection mode, the mobile terminal can perform the face recognition processing with respect to the video data of the other party displayed in the other party display area 610 according to the event execution of the present invention.

Additionally, when all video data items (user/other party) are set up in the selection mode, the mobile terminal can perform the face recognition processing with respect to each video data displayed in the other party display area 610 and the user display area 620, according to the event execution of the present invention.

Then, the application mode indicates a mode that sets a part to which animation effect is applied to the different video data. In the present invention, video data can be classified into at least two partial video data. That is, the video data can be classified into face data indicating the face part of user and background data indicating a part excluding the face data from the video data, that is, the background part.

Therefore, the user can designate at least one partial video data giving animation effect in the application mode. And then, the mobile terminal determines the partial video data (face data/background data) according to the setting of the application mode, applies various event data to a corresponding partial video data (face data/background data) and outputs the combined video data. For example, in the application mode of Table 1, the mobile terminal can output event data on face data among video data according to the event execution of the present invention when the face data item is set.

Such examples of screen are shown in the reference numeral 630 of FIG. 6a, and the reference numeral 640 of FIGS. 6b and 6c. FIG. 6a illustrates an example of outputting the event data (glasses item) 630 on face data among user video data, FIGS. 6b and 6c illustrates examples of outputting event data (glasses item) 640 on the face data contained within the other party's video data. Moreover, when the background data item is set in the application mode, the mobile terminal can output event data on background data among video data according to the event execution of the present invention. This example of screen is shown in the reference numeral 650 of FIG. 6*c*. FIG. 6*c* illustrates an example of outputting an event data (heart item) 650 on background data among user video data.

Additionally, when all partial video data (face/background data) items are set in the application mode, the mobile terminal can output event data to the whole video data; i.e., both of the face data and the background data according to the event execution. This example of screen is shown in FIGS. 6*a* to 6*c*. That is, in FIG. 6*c*, the event data 650, is outputted with the face data of the user video data in the user video data display area 620.

As shown in Table 1, event data outputted with the video data can be selected according to the setting of the application mode. When the face data is set in the application mode, a group of event data can be expressed along with the face data For example, event data that corresponds to an accessory item, which will be described later, may be extracted. Moreover, when the background data is set in the application mode, a group of event data that can be expressed on the background data, for example, event data that corresponds to a feeling item may be extracted. That is, when the face data is designated, the mobile terminal can output at least one event data belonging to the accessory item along with the face data among user video data or the other party video data. Moreover, when the background data is designated, the mobile terminal can output at least one event data belonging to a feeling item along with background data among user video data or the other party video data.

Moreover, according to an exemplary embodiment of the present invention, the accessory item and the feeling item can be selected according to face state information which the mobile terminal recognizes.

For example, when face data of the application mode is set, it is operated through the face shape discernment of a person according to the face data, while, when background data of the application mode is set, it is operated through the facial expressions discernment of the person according to the face data. Thus, when it is operated through the face shape discernment, corresponding to each face shape, a group of event data that can make up the face of person, for example, an accessory item may be extracted. Moreover, when it is operated through the facial expressions discernment, corresponding to each facial expression, a group of event data that can express the feeling of person on the face data or background data, for example, event data corresponding to a feeling item may be extracted.

In the meantime, the operation of outputting event data to the video data, the face data and the background data described above is illustrated with reference to drawings which will be described later. Then, reference state information used in the present invention and event data mapped to the reference state information are illustrated with reference to Table 2.

TABLE 2

| event data | | reference state information |
|---|---|---|
| accessory item | event data 1 | face information 1 |
| | event data 2 | face information 2 |
| | event data 3 | face information 3 |
| | . . . | . . . |

TABLE 2-continued

| event data | | reference state information |
|---|---|---|
| feeling item | event data A | face information A |
| | event data B | face information B |
| | event data C | face information C |
| | . . . | . . . |

As shown in Table 2, the event data of the present invention can be classified into an accessory item and a feeling item.

The accessory item indicates a group of event data that can give an animation effect caused by various accessory items to video data obtained through a face recognition processing. For example, the accessory item can be classified into sub-category including a glasses item, a whisker item, an earrings item, and a wig item. It would also be recognized that the items may also include various event data. For example, the glasses item can have at least one event data corresponding to an item such as general glasses, sunglass, and goggles or the like, and to various shapes of glasses. The feeling item indicates a group of event data that can give an animation effect caused by a feeling expression item. The feeling expression item may express various feeling of a person onto video data obtained through the face recognition processing.

For example, the feeling item may be classified into a sub-category including a love item, which expresses the feeling of love, a joy item, which expresses a feeling of joy, a sorrow item, which expresses the feeling of sorrow, an anger item, which expresses the feeling of anger among the feeling of a person. In addition, each item may also include various event data. For example, the love item can have an item such as a heart composed of various forms, a firecracker, and a character (LOVE or the like) related to love, and at least one event data that classifies each item according to a form.

Moreover, the accessory item can include event data which is applied according to the face shape of a person in the embodiment of the present invention. The face shape of a person can be classified into an ellipse type, a square type, a circle type, a rhombus type, a triangle type and an inverted triangle type. Therefore, each information according to the face shape of a person can be mapped to the reference state information. According to each reference state information, at least one accessory item, that is, corresponding event data can be mapped.

For example, event data including the glasses item 1 and the hat item 2 can be mapped to triangle state information among the reference state information. Event data including the goggle item 3, the whisker item 2, and the earrings item 1 can be mapped to the circle type face shape. Event data such as the sunglass item 2 can be mapped to the ellipse type face shape. The face shape can be distinguished by the face recognition technology. For example, it can be distinguished by the technique including the Principal Components Analysis (PCA), the Template Matching, and the Snakes. The feeling item includes event data that may be applied according to the face expression of a person in the embodiment of the present invention. That is, the feeling item can include event data that corresponds to the face expression of a person and can express the feeling of the person. The face expression of the person can be expressed by the feeling of sorrow, joy, anger, melancholy, and love, for example. Therefore, in the embodiment of the present invention, corresponding to the feeling classification of a person, the reference state information can be defined. That is, each information according to the face expression (or feeling) of a person can be mapped to the reference state information. And, at least one feeling item, that is, corresponding event data can be mapped according to each reference state information.

For example, event data such as the heart item can be mapped to the state information of the face expression which expresses the feeling of the love among the reference state information. Event data including a flower and a firecracker can be mapped to the state information of the face expression which expresses the feeling of joy. The face expression can be distinguished by the face recognition technology. For example, it can be distinguished by the technique of the Active Appearance Model (AAM), the Enhanced Fisher linear discrimination Model (EFM), the Gabor representation, the Template Matching, the Direction Model, and the Direction pattern. Each of these models is well-known in the art and need not be discussed in detail herein.

According to an exemplary embodiment of the present invention, event data according to the accessory item and event data according to the feeling item can be applied to both face data and background data of video data, respectively. However, in the description of the embodiment of the present invention, for the sake of convenience in describing the present invention, it is assumed that event data of the accessory item is provided on face data, and event data of the feeling item is provided on background data. In the meantime, the event data of the present invention which is illustrated with reference to Table 2, can be data including the emotion, still images, animation image, and moving pictures. Moreover, at least one event data can be mapped to each reference state information. And, in the mobile terminal according to an exemplary embodiment of the present invention, the operation of using the face recognition technology, and applying an animation effect to the user and/or the other party video data during the video telephony call is shown in FIG. 6c, for example. However, since the mobile terminal of the present invention is not limited to the description provided herein, it should be noted that the present invention can be applied to various embodiments based on the embodiments described herein.

FIG. 1 is a flow chart illustrating an exemplary process for outputting an animation effect during a video telephony call in a mobile terminal according to an exemplary embodiment of the present invention.

Particularly, as illustrated in the description referring to the Table 1, FIG. 1 illustrates an example of the operation of giving the animation effect by various setting information of user.

Referring to FIG. 1, the mobile terminal can perform the video telephony call with a mobile terminal of another party in response to the user's request (101). The mobile terminal can check whether an event execution is requested during the video telephony call (103).

In the present invention, the event can be an event for providing an animation effect, for example. That is, it can be an event for outputting various above-described event data along with video data provided through the video telephony call. The event execution can be inputted by the manipulation of a specific function key of the mobile terminal in which the function for the event execution of the present invention is established. The detailed description of the event execution and function key is illustrated with reference to drawings that will be described later. If the mobile terminal senses the execution of an event from the user, a preset event mode is determined (105). As described above in the description referring to the above-described Table 1, the event mode is classified into a selection mode and an application mode, and a setting by a user can be accomplished in the respective modes. Then, the mobile terminal performs the face recognition processing by using a specific video data according to the event mode, particularly, the setup information of the selection mode (107).

For example, the face recognition processing for at least one video data from among video data of the user display area and video data of the other party display area can be performed. The mobile terminal obtains the state information of the face from corresponding video data by the face recognition processing (109). The face state information can be at least one state information from among the face state information of the mobile terminal user or the face state information of the other party.

The mobile terminal analyzes the obtained face state information (111). The face state information includes information regarding eyes, nose, mouth, lip shape, ear, philtrum, brow, and face shape, etc. Accordingly, the mobile terminal extracts reference state information corresponding to acquisition state information of the video data by comparing the obtained state information (acquisition state information) with the preset state information (reference state information). Then, the mobile terminal extracts event data mapped to the extracted reference state information (113). The event data according to the reference state information is identical with the description referring to above-described Table 2.

The mobile terminal then outputs the extracted event data along with (i.e., in conjuction with) the video data (115). At this time, when outputting the event data, event data is outputted with face data among the video data, or event data is outputted with background data among the video data, or event data can be outputted with all video data (face/background data) according to the set event mode. Moreover, at least one event data corresponding to the accessory item is outputted to at least one partial video data among face data and background data, or at least one event data corresponding to the feeling item is outputted to at least one partial video data among face data and background data according to the state information.

Figure 2:
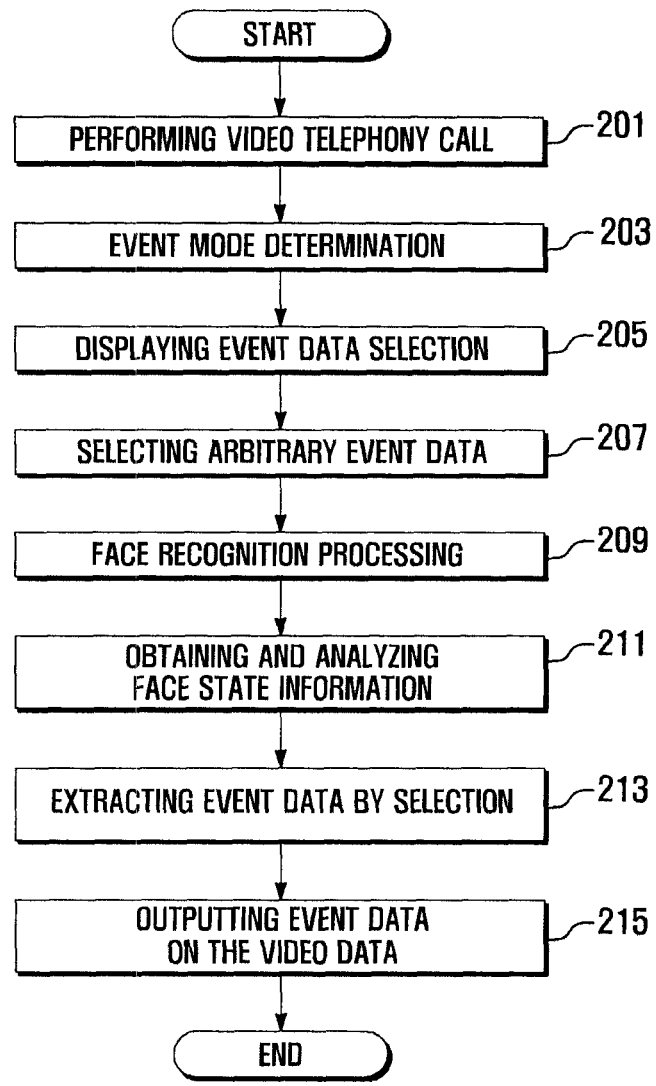
FIG. 2 is a flowchart illustrating an operation of outputting an animation effect during a video telephony call according to an exemplary embodiment of the to present invention.

FIG. 2 is a flowchart illustrating an operation of outputting an animation effect during a video telephony call in a mobile terminal according to an exemplary embodiment of the present invention.

Particularly, FIG. 2 illustrates an example of the operation of providing an animation effect determined by an event data according to the user's selection among various event data as shown in Table 2. Referring to FIG. 2, firstly, the mobile terminal can perform the video telephony call with a mobile terminal (or other communication device) of another party in response to the user's request (201). Then, the mobile terminal can sense the event execution request during the video telephony call. When sensing the event execution, a preset specific function key may be inputted during the video telephony call, which can be deemed to be an event execution request. Then, if the mobile terminal senses the event execution from a user, a preset event mode is determined (203).

As described above in the description referring to above-described Table 1, the event mode is classified into the selection mode and the application mode. In FIG. 2, it is assumed that a user setting is performed with respect to the selection mode and the application mode. Additionally, the selection mode and the application mode can be set during the video telephony call in response to the user's request. Then, the mobile terminal displays a selection window for the user selection of event data (205). At this time, in the embodiment of the present invention, event data is sub-classified into an accessory item and a feeling item. Accordingly, the mobile terminal can display the selection window that selects the main category like the accessory item or the feeling item.

When the feeling item or the accessory item is selected by the selection window, the mobile terminal can display an event data selection window for the user selection by extracting event data belonging to a corresponding classification. The mobile terminal senses the selection of arbitrary event data by the selection window (207). At this time, one event data or a plurality of event data corresponding to the user's request can be selected. The mobile terminal performs the face recognition processing by using a specific video data according to the event mode, particularly, the setting information of the selection mode (209). For example, the face recognition processing of at least one video data among video data in a user display area and video data in the other party's display area can be performed.

The mobile terminal next obtains the state information of the face from a corresponding video data by the face recognition processing and analyzes it (211). The face state information can be the face state information of the mobile terminal user, or can be at least one state information among the face state information of the other party. Moreover, the state information includes elements such as eye(s), nose, mouth, lip shape, ear, philtrum, brow, and face shape corresponding to face data in the pertinent video data. This element can be extracted by various technologies which are implemented in the face recognition technology field. However, in the present invention, the above described element is extracted by the above described technology, and location information of face data and elements configuring the face data can be obtained by the extracted element. Therefore, the mobile terminal can confirm the location of face data of the video data and the location of each element by the state information. Then, the mobile terminal may extract the event data selected by step 205 and step 207 (213), and output the event data along with the video data (215). At this time, according to the setting information set in the event mode and the state information, the output of the event data can be outputted along with at least one of face data and background data of the video data. Here, step 209 to step 213 can be performed through a background processing, while a user can recognize that a corresponding event data is immediately indicated to the event data in the selection of the event data.

Figure 3:
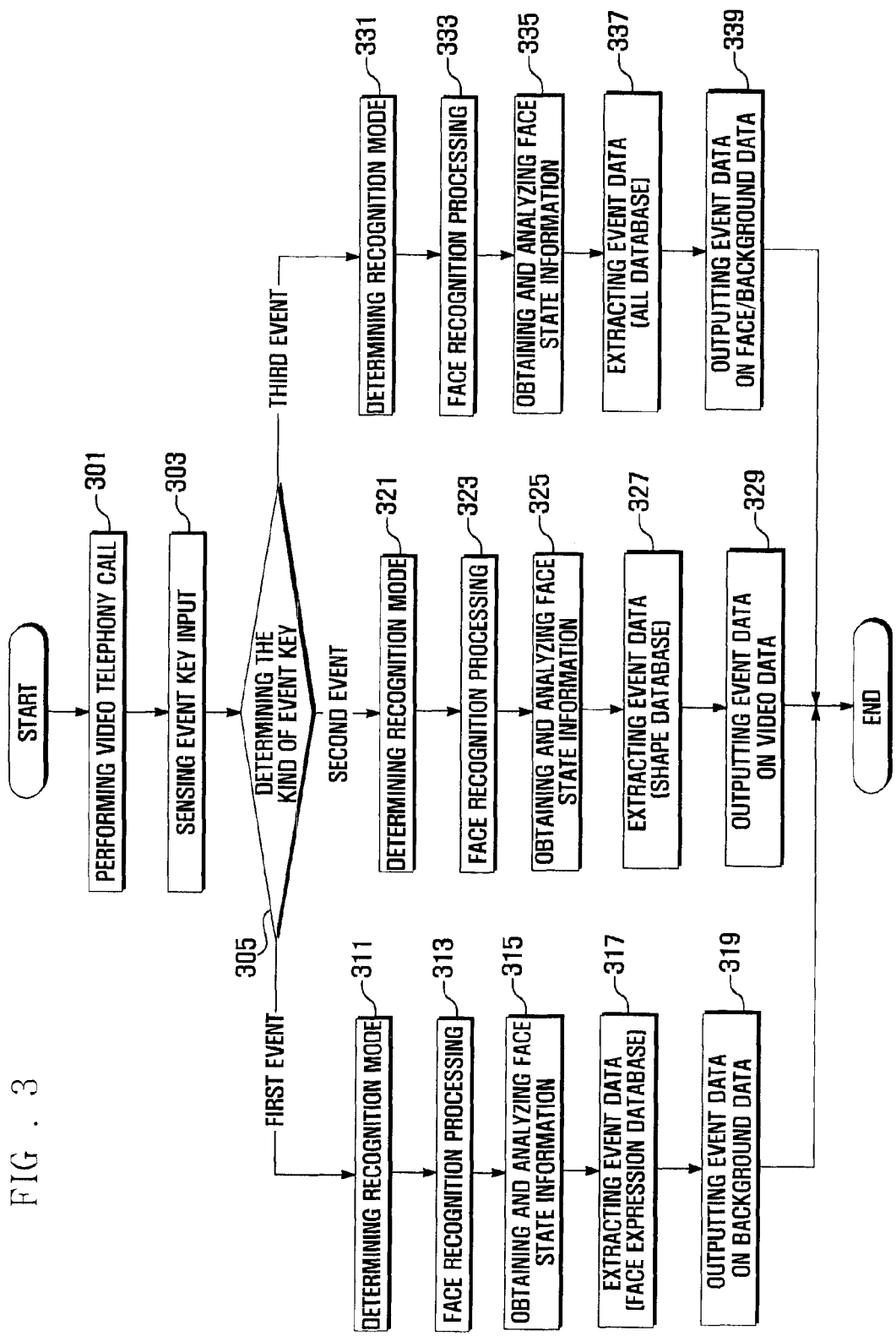
FIG. 3 is a flowchart illustrating an operation of outputting an animation effect during a video telephony call according to an exemplary embodiment of the present invention.

FIG. 3 is a flowchart illustrating an operation of outputting an animation effect during a video telephony call in a mobile terminal according to an exemplary embodiment of the present invention.

Particularly, FIG. 3 illustrates an example of the operation of providing an animation effect of the present invention as described above in the description referring to the above-described FIGS. 1 and 2 by the operation of function keys that are previously set in the mobile terminal.

Referring to FIG. 3 the mobile terminal can perform the video telephony call with another party's mobile terminal (or other type of communication device) in response to the user's request (301). The mobile terminal can sense the event execution request during the video telephony call (303).

In FIG. 3, when sensing the event execution, in case a preset specific function key is inputted during the video telephony call, this can be sensed as the event execution request. At this time, in FIG. 3, the specific function key can be one among a plurality of function keys that correspond to the description referring to above-described Table 1 and Table 2 and provides an animation effect corresponding to the accessory item, or a function key which provides an animation effect corresponding to the feeling item or a function key that provides an animation effect in a random manner. That is, an exemplary embodiment of the present invention can include a plurality of event keys that provide an animation effect.

When the mobile terminal senses an event key input from user, it determines the kind of the inputted event key (305). In the embodiment of the present invention, the event key can include a first event key for a first event which outputs event data according to the feeling item by distinguishing the face expression of video data, and a second event key for a second event which outputs event data according to the accessory item by distinguishing the face shape of video data. Additionally, an exemplary embodiment of the present invention can further include a third event key for a third event which randomly outputs the event data of an arbitrary number among all event data according to the accessory item and the feeling item.

The case of including the first event key, the second event key and the third event key is now exemplified.

When the mobile terminal determines that the event key is a first event key input for a first event (event data output event of the feeling item by the face expression recognition) at step 305, the mobile terminal determines a preset event mode (311).

As described in Table 1, the event mode is classified into a selection mode and an application mode. And, in FIG. 3, it is assumed that the user setting is performed with respect to the selection mode. Additionally, the selection mode can be set on a real-time basis during the video telephony call in response to a user's request. Moreover, when enforcing the function of the present invention, the selection mode can be set in response to the user's request. The mobile terminal performs the face recognition processing by using a specific video data according to the event mode, particularly, the setting information of the selection mode (313). For example, the face recognition processing for at least one video data among video data of user display area and video data of the other party's display area can be performed. The mobile terminal obtains the state information regarding a face from a corresponding video data by the face recognition processing, and analyzes the state information (315).

The state information corresponds to the description referring to the above-described FIGS. 1 and 2. The mobile terminal can extract the reference state information corresponding to the acquisition state information of the video data by comparing the obtained state information (acquisition state information) with the preset state information (reference state information). Then, the mobile terminal extracts event data mapped to the reference state information (317).

At this time, the event data at step 317 can extract at least one event data corresponding to the reference state information from a database consisting of event data that correspond to the first event key input and expresses the feeling as an event that is classified into the category of a feeling item. Here, as also shown in FIG. 2, a corresponding event data according to the user's desire can be designated by the user's request. Then, the mobile terminal outputs the extracted event data along with the video data (319).

When outputting the extracted event data, the event data can be outputted with the face data among the video data according to the setting information of the application mode, or the event data can be outputted with the background data among the video data. Particularly, in FIG. 3, it is preferable that event data of the feeling item is outputted on the background data by the first event key.

When the mobile terminal determines that the event key is a second event key input for a second event (event data output event of the accessory item by the face shape recognition) at step 305, the mobile terminal determines a preset event mode (321). The event mode corresponds to the description of above-described pertinent operation part as discussed with regard to step 311.

The mobile terminal performs the face recognition processing by using a specific video data according to the event mode, particularly, the setting information of the selection mode (323). For example, the face recognition processing of at least one video data among video data of a user display area and video data of the other party's display area can be performed. Then, the mobile terminal obtains the state information of face from a corresponding video data by the face recognition processing and analyzes the state information (325). The state information corresponds to the description of the above-described pertinent operation part discussed with regard to step 315.

Thereafter, the mobile terminal can extract the reference state information corresponding to the acquisition state information of the video data by comparing the obtained state information (acquisition state information) with the preset state information (reference state information). The mobile terminal next extracts event data mapped to the reference state information (327).

The event data at step 327 can extract at least one event data corresponding to the reference state information from a database consisting of event data that corresponds to the second event key input and makes up the face. That is event data that is classified into the category of accessory item in response to the second event key input. Here, as also shown in FIG. 2, a corresponding event data according to the user's desire can be designated by the user's request. Then, the mobile terminal outputs the extracted event data along with the video data (329).

When outputting the extracted event data, the event data can be outputted along with face data among the video data according to the setting information of the application mode, or the event data can be outputted along with background data among the video data. Particularly, in FIG. 3, it is preferable that event data of the accessory item is outputted on the face data by the second event key.

When the mobile terminal determines that the event key is a third event key input for a third event (event data output event of the feeling and the accessory item) at step 305, the mobile terminal determines a preset event mode (331). The event mode corresponds to the description of above-described pertinent operation part as discussed with regard to step 311.

The mobile terminal performs the face recognition processing by using a specific video data according to the event mode, particularly, the setting information of the selection mode (333). For example, the face recognition processing of at least one video data among video data of the user display area and video data of the other party's display area can be performed. Then, the mobile terminal obtains the state information of the face from a corresponding video data by the face recognition processing and analyzes the state information (335). The state information corresponds to the description of above-described pertinent operation part as described with regard to step 315.

Thereafter, the mobile terminal can extract the reference state information corresponding to the acquisition state information of the video data by comparing the obtained state information (acquisition state information) with the preset state information (reference state information). The mobile terminal then extracts event data mapped to the reference state information (337).

The event data at step 337 can extract at least one event data corresponding to the reference state information from event data of the category of an accessory item and a feeling item in response to the third event key input. Here, as also shown in FIG. 2, a corresponding event data according to the user's desire can be designated by the user's request. Then, the mobile terminal outputs the extracted event data on the video data (339).

When outputting the extracted event data, the event data can be outputted along with face data among the video data according to the setting information of the application mode, or the event data can be outputted along with background data among the video data. Particularly, in FIG. 3, it is preferable that the event data is outputted on at least one partial video data among the face data and the background data by the third event key according to the extracted event data.

Figure 4:
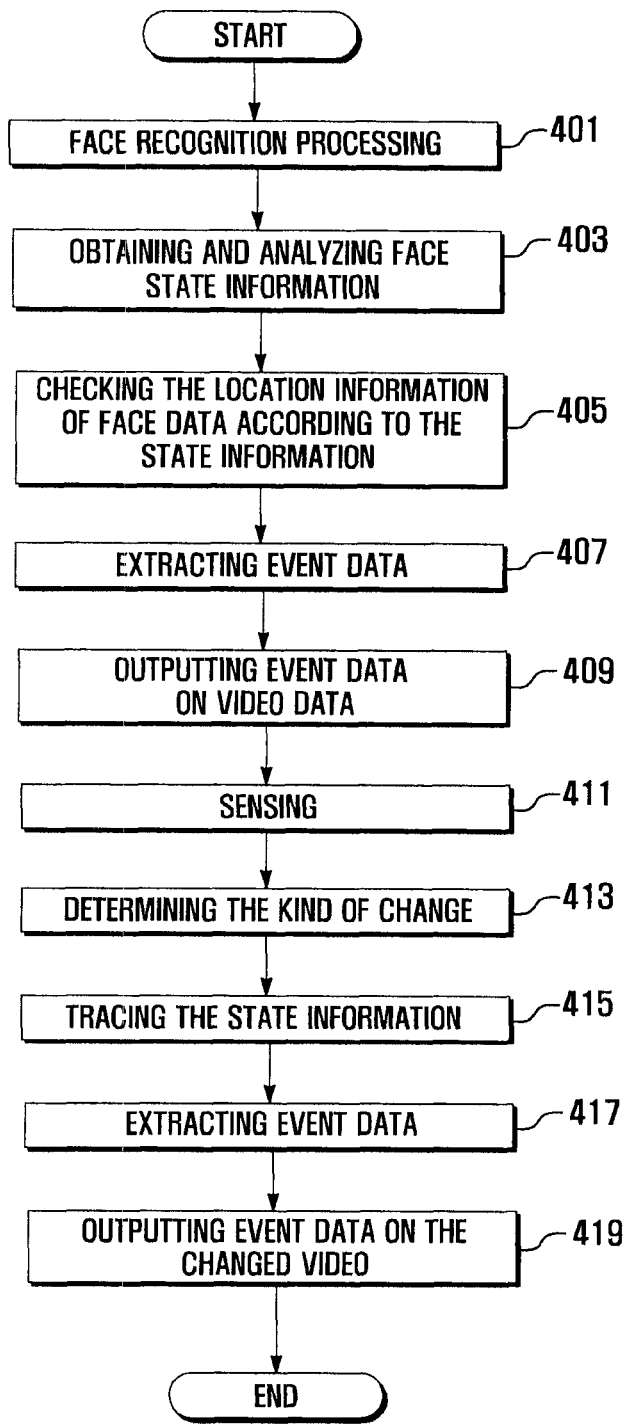
FIG. 4 is a flowchart illustrating an operation of applying event data to video data in a mobile terminal according to an exemplary embodiment of the present invention.

FIG. 4 is a flowchart illustrating an operation of applying event data to video data in a mobile terminal according to an exemplary embodiment of the present invention.

Referring to FIG. 4, the mobile terminal performs a face recognition processing of at least one video data among video data of a user display area and video data of the other party's display area, based on the procedure(s) illustrated in the description referring to FIG. 1 to FIG. 3 (401). The mobile terminal obtains the state information of the face from pertinent video data by the face recognition processing, and analyzes the state information (403).

The face state information can be at least one state information among the face state information of the mobile terminal user or the face state information of the other party. Moreover, the state information includes elements such as eye(s), nose, mouth, lip shape, ear, philtrum, brow, and face shape, etc., corresponding to face data in the pertinent video data. This element can be extracted by various technologies which are implemented in the face recognition technology field. However, in the present invention, the above described element is extracted by the above described technology, and the location information of the face data and the elements configuring the face data can be obtained by the extracted element. Therefore, the mobile terminal can check the location of face data of the video data and the location of each element by the state information. That is, using the state information analysis, the mobile terminal can check the location information of face data according to the state information (405). The mobile terminal extracts event data to be expressed in conjunction with the video data, based on the procedure illustrated in the description referring to FIG. 1 to FIG. 3 (407).

At this time, the operation of step 405 and step 407 are not necessarily operated with the order illustrated, and it may be acceptable that any step can be performed first. Here, the extraction of event data can be performed according to the description illustrating a pertinent operation corresponding to the event data extraction. The mobile terminal outputs the extracted event data on video data (409). When outputting the event data, the event data can be outputted in conjunction with (or along with) face data or background data through the location information of face data obtained at step 405 and the state information. Particularly, when the event data is an event data belonging to the feeling item classification, the location of face data is obtained based on the location information and the state information, and event data can be outputted in conjunction with background data except the face data based on a contour line configuring the face data. Moreover, when the event data is an event data belonging to the accessory item classification, the location of face data and the element of face data are obtained based on the location information and the state information, and event data can be outputted based on each element configuring the face data. In the meantime, though it was omitted in the description of FIG. 4, but the mobile terminal can continually perform the above-described face recognition processing during the video telephony call. This face recognition processing can be performed until the user's request or the termination of video telephony call, and can be periodically performed with a time unit that is set by a user setting, or can be adaptively performed in response to the user's request. Moreover, the mobile terminal can check the result according to the face recognition processing and check the change of video data.

The mobile terminal can sense a change while outputting arbitrary event data to the video data (411). That is, the mobile terminal can sense the change of face data. The change can include a change of face size, a change of face expression, a change of face shape, and a change of location. Accordingly, the mobile terminal determines the kind of change according to the change when sensing the change (413).

The mobile terminal traces the state information of face in the face data (415). That is, the mobile terminal can re-analyze the state information corresponding to the kind of change. For example, the state information according to the size change is newly analyzed when sensing the size change of face. The state information according to the change of face expression is newly analyzed when sensing the change of face expression. The state information according to the change of face shape is newly analyzed when sensing the change of face shape. The state information according to the location change can be newly analyzed when sensing the location change. Each sensing of change can be performed by comparing the previously obtained state information with the state information obtained by the face recognition processing which is continually performed. At this time, the comparison can be performed in a preset error range. That is, the comparison can be performed not by calculating the exact match value of the state information, but by determining whether it is included within the preset error range.

Then, the mobile terminal newly extracts event data corresponding to the kind of change (417), and outputs the extracted event data on the changing video data (419).

For example, in case the change is a size change of a face, event data that correspond to the changed size is extracted to be output. For example, assuming that the event data is a glasses item which is outputted within face data and the size of the face is enlarged over the previous face data, the mobile terminal changes the size of glasses item, which was previously indicated to corresponding to face data, according to the size of the new face data, or extracts a new glasses item corresponding to the new face size and then outputted with the enlarged face data. Alternatively, when a change is indicated to be a location change, event data that corresponds to the changed location is extracted to be outputted. For example, assuming that the event data is a heart item, which is outputted to background data, and the location of a face is changed, the mobile terminal can move and output the location of the heart item, which was previously indicated to the background data, according to the changed location of the face data in response to the location change of the face data.

According to an exemplary embodiment of the present invention, as described above, the operation of capturing and storing the video data to which the event data is associated with in response to the user's request during outputting an event data in conjunction with video data can be performed. That is, capturing of the outputted data can be automatically performed with respect to video data currently being provided along with the associated event data. For example, when event date is being outputted in conjunction with user video data of a user display area, the capturing of user video data to which the event data is associated can be performed in the user display area. Moreover, when event date is being outputted to other party's display area, the capturing of the other party video data in conjunction with the associated event data can be performed in the other party's display area. Additionally, in case the event data of the present invention is associated with each video data of the user display area and the other party's display area, the above described capturing can be performed with respect to each video data.

A method of providing an animation effect which is a function of the present invention during a video telephony call of a mobile terminal according to an exemplary embodiment of the present invention has been explained. Then, a mobile terminal that performs the operation of the present invention as explained in the description of FIGS. 1 to 4 will be described. However, the mobile terminal of the present invention is not limited to the description provided herein, but can be applied to various embodiments based on the embodiments described.

Before the detailed description of a mobile terminal of the present invention, the mobile terminal of the present invention will be explained as a mobile communication terminal for the convenience of illustration. However, the present invention is not limited to the mobile communication terminal. That is, the present invention can be applied to a mobile terminal and other various devices which support a video telephony call with at least one other party, such as a personal computer (PC), a notebook and a PMP (Portable Multimedia Player). Moreover, providing an animation effect of the present invention can be applied to video chatting or the like as well as the video telephony call. Hereinafter, a schematic configuration of a mobile terminal of the present invention will be described with reference to FIG. 5.

Figure 5:
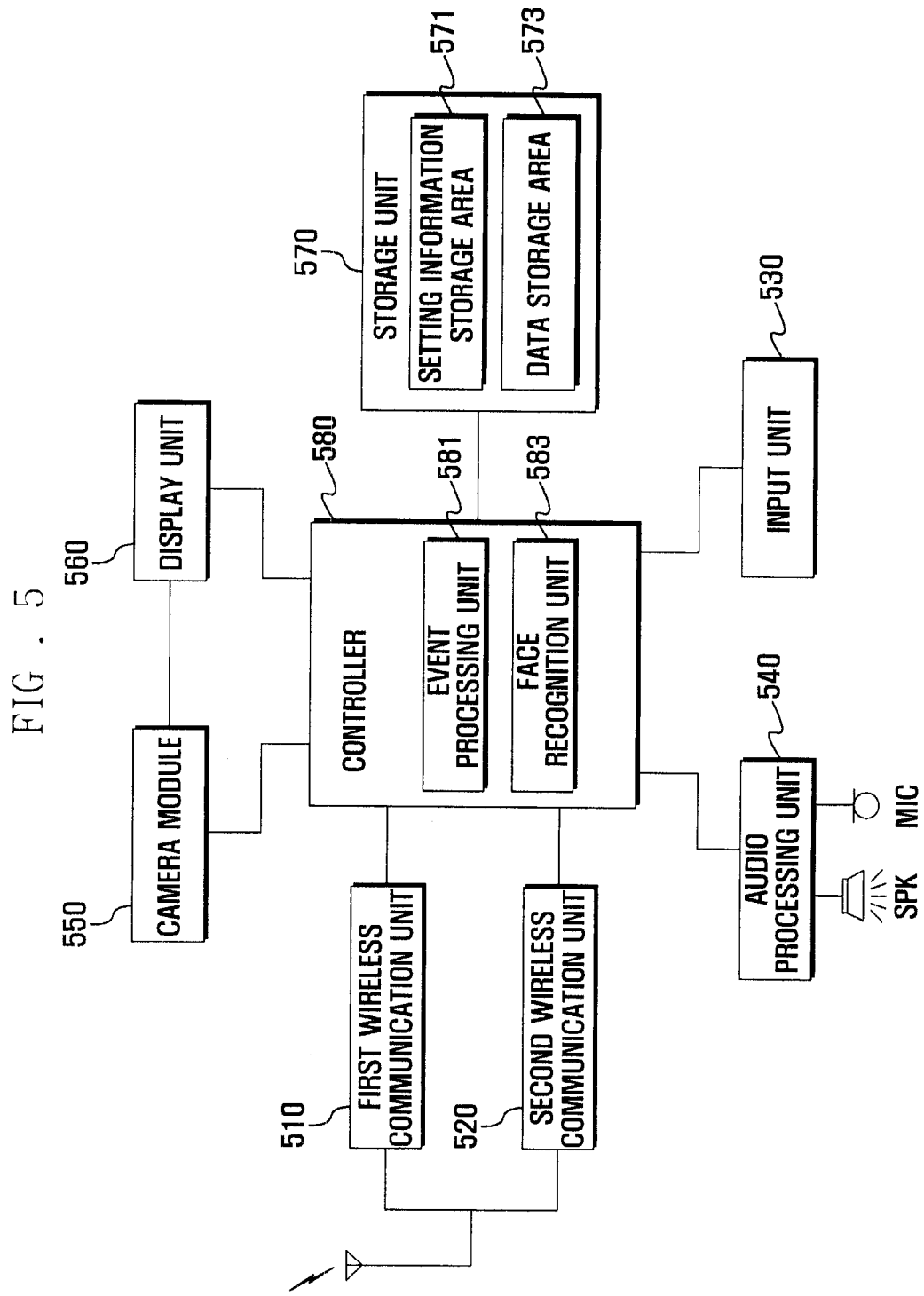
FIG. 5 is a block diagram illustrating a schematic configuration of a mobile terminal according to an exemplary embodiment of the present invention.

FIG. 5 is a block diagram illustrating a schematic configuration of a mobile terminal according to an exemplary embodiment of the present invention. Particularly, in FIG. 5, the case where a mobile terminal is a mobile communication terminal is explained, but the mobile terminal of the present invention is not limited to the mobile communication terminal.

Referring to FIGS. 1 to 5, a mobile terminal according to an exemplary embodiment of the present invention includes a first wireless communication unit 510, a second wireless communication unit 520, an input unit 530, an audio processing unit 540, a camera module 550, a display unit 560, a storage unit 570 and a controller 580. Moreover, the storage unit 570 includes a setting information storage area 571 and a data storage area 573, and the controller 580 includes an event processing unit 581 and a face recognition unit 583.

The first and second wireless communication units 510 and 520 perform communications of the mobile terminal. The first and second wireless communication units 510 and 520 respectively form communication channels with supportable mobile communication networks, and perform one of communications including voice communication, video communication and data communication. The first and second wireless communication units 510 and 520 can include a RF (Radio Frequency) transmission unit which up-converts and amplifies the frequency of transmitted signals and a RF reception unit which low-noise amplifies received signals and down-converts the frequency.

Particularly, one of the first and second wireless communication units 510 and 520 forms a communication channel having a set method (protocol) with a third (and/or fourth) generation network and processes communication of the mobile terminal, and the other wireless communication unit forms a communication channel having a set method with a second generation network and processes communication of the mobile terminal. For example, the first wireless communication unit 510 may be a module that is connected to a second generation network through an allocated communication channel by a second generation communication method and processes RF signals, and the second wireless communication unit 520 may be a module which forms a communication channel with a third generation network by a third generation communication method and processes RF signals.

In the exemplary embodiment of the present invention, one wireless communication unit (e.g., the second wireless communication unit 520) which processes video communication among the first and second wireless communication units 510 and 520 receives video data of the other party transmitted from the mobile terminal of the other party through a mobile communication network. Particularly, the wireless communication unit which processes the video communication, that is, the second wireless communication unit 520, receives the video data through the third generation network. The second wireless communication unit 520 transmits video data of a user obtained through the camera module 550 of the mobile terminal under the control of the controller 580 to the mobile terminal of the other party through the mobile communication network.

The input unit 530 receives various character information, and transmits signals inputted in connection with the setting of various functions and the function control of the mobile terminal to the controller 580. The input unit 530 can generate input signals according to a user's behavior and includes at least one of a keypad and a touch pad (not shown). The input unit 530 and the display panel 560 can be configured in the form of one touch panel (or touch screen) and can perform input and display functions at the same time. Particularly, the input unit 530 may include at least one function key (not shown) for performing the function of the present invention. The function key may include a function key for performing a function of providing an animation effect of the present invention during a video telephony call, a function key corresponding to a first event key for executing a first event of the present invention, a function key corresponding to a second event key for executing a second event and a function key corresponding to a third event key for executing a third event.

The audio processing unit 540 is connected to a microphone (MIC) and a speaker (SPK), converts audio signals inputted from the microphone into data, outputs the data to the controller 580, converts audio signals inputted from the controller 580 into audible sounds through the speaker and outputs the audible sounds. That is, the audio processing unit 540 converts analog audio signals inputted from the microphone into digital audio signals or converts digital audio signals inputted from the controller 580 into analog audio signals and outputs through the speaker. The audio processing unit 540 can replay various audio elements generated in the mobile terminal (e.g., audio signals according to replay of MP3 files or the like) according to user's selection.

The camera module 550 converts light inputted through a camera lens into digital data through a sensor. The camera module 550 may include a camera sensor, which converts inputted light signals into electric signals, and a signal processing unit, which converts analog video signals taken from the camera sensor into digital data (neither of which are shown). The camera sensor and the signal processing unit can be integrally or separately implemented. Particularly, the camera module 550 takes user's video during a video telephony call and transmits the taken video data to the display unit 560 and the controller 580. The camera module 550 can be turned on according to the control of the controller 580 during a video telephony call.

The display unit 560 displays screen data generated during execution of a function of the mobile terminal and displays state information according to user's key manipulation and function setting. The display unit 560 can display an event data selection window and a setting selection window according to provision of an animation effect according to the control of the controller 580 or under the control of the user. The display unit 560 visually displays various signals and color information outputted from the controller 580. The selection window can be provided in the form of a pop-up. The display unit 560 can operate as an input means which receives inputs of user if the display unit 560 is implemented as a touch screen.

Particularly, the display unit 560 displays video data of a user outputted from the camera module 550 and video data of the other party's mobile terminal received from the other party's mobile terminal through the communication unit 520 during a video telephony call of the mobile terminal. That is, the display unit 560 can be classified into a user display area for displaying video data of user and an other party display area for displaying video data of the other party mobile terminal user in a video telephony call, (see FIGS. 6*a*-6*c*). Or in accordance with a user's selection only one display area may be displayed or omitted according.

The storage unit 570 can be configured of ROM (Read Only Memory) and RAM (Random Access Memory) or the like. The storage unit 570 can store various data which is generated and utilized in the mobile terminal. The data includes data generated according to execution of an application of the mobile terminal and all types of data that is generated using the mobile terminal or is received from the outside (a base station, another party's mobile terminal, a personal computer or the like) and can be stored. Particularly, the data includes various event data for providing an animation effect of the present invention and can include a user interface provided by the mobile terminal and various setting information according to use of the mobile terminal. The storage unit 570 can store data that is necessary for communication through the first and second wireless communication units 510 and 520.

Particularly, the storage unit 570 stores various setting information for executing functions that provide an animation effect of the present invention. The setting information corresponds to the above explanation with reference to Table 1, and such setting information can be stored in the setting information storage area 571. Also, the storage unit 570 stores various data that is necessary for executing functions that provide an animation effect of the present invention. The various data includes event data and basic state information as explained in the above explanation with reference to Table 2, and such various data can be stored in the data storage area 573.

Further, the storage unit 570 can store an application for controlling generation operation of the mobile terminal and an application for controlling an animation effect of the present invention. Such an application may be an application corresponding to the operation of the present invention as explained in FIGS. 1 to 6*c*. Such an application may be stored in an application storage area (not shown) of the storage unit 570.

Also, the storage unit 570 may include one or more buffers that temporarily stores data generated during execution of the above-mentioned application. Also, the storage unit 570 may be configured inside the mobile terminal or may be configured external to the mobile terminal (as in a smart card), and may include all internal and external storage media. The storage unit 570 may include a ROM, a RAM and a flash memory, and the storage unit may be configured as a respective ROM, RAM or flash memory or as one or two integrated memories such as an MCP (Multi Chip Package). Additionally, the storage unit 570 may further include a DRPRAM (Dual-Ported RAM) allocated for sharing data.

The controller 580 executes general control functions for the mobile terminal and controls signal flows between the blocks within the mobile terminal. The control unit 580 controls signal flow between the units such as the first wireless communication unit 510, the second wireless communication unit 520, the input unit 530, the audio processing unit 540, the camera module 550, the display unit 560 and the storage unit 570.

Particularly, the controller 580 controls a series of functions related with providing an animation effect of a mobile terminal according to an exemplary embodiment of the present invention. The controller 580 controls a series of communication functions related with a video telephony call, and controls display of video data of a user and video data of another party obtained during the video telephony call. The controller 580 activates the function of the present invention in response to user's request inputted during the video telephony call and processes face recognition processing according to the activation of the function. The function activation of the controller 580 can be performed by input of a function key for executing a function which provides an animation effect of the present invention.

Also, when activating the function during the video telephony call, the controller 580 controls a series of operations that output certain event data in conjunction with the video data in response to the event mode. Also, when activating the function during the video telephony call, the controller 580 controls a series of operations that output certain event data on the video data in response to input of the function key of one of a first event key, a second event key and a third event key. The controller 580 includes an event processing unit 581 which processes an animation effect event of the present invention and a face recognition unit 583 which is in charge of face recognition processing for video data of user and/or video data of other party.

Also, according to an exemplary embodiment of the present invention, the controller 580 can capture and store video data which reflects event data in response to user's request while outputting the event data in conjunction with the video data. At this time, the event data provided by the event data can be automatically captured.

For example, in case event data is being outputted on user video data of a user display area, the controller 580 can capture user video data which reflects the event data in the user display area. Also, in case event data is being outputted in conjunction with video data of the other party the controller can capture the video data which reflects the event data in the display area of other party. Moreover, in case event data of the present invention is reflected on each video data of the user display area and the other party display area, each video data can be captured.

The controller 580 and the event processing unit 581 and the face recognition unit 583, which perform some of the functions of the controller 580, can control general operations of the present invention as explained in the explanation with reference to FIGS. 1 to 6c. The function control of the controller 580 can be implemented as a software program and process operations of the present invention.

Further, in the embodiment of the present invention, it was explained that transmission and reception of signals through the first wireless communication unit 510 and transmission and reception of signals through the second wireless communication unit 520 is controlled by one controller, that is, the controller 580, but a controller for controlling the first wireless communication unit 510 for the first communication and a controller for controlling the second wireless communication unit 520 for the second communication can be separately configured. At this time, a controller for controlling the first wireless communication unit 510 and a controller for controlling the second wireless communication unit 520 can be a main controller that controls overall operations of a corresponding communication and mobile terminal, and other controllers can be a sub-controllers that control only a corresponding communication function or operation.

Moreover, the controller 580 may include a baseband module for the mobile communication service of the mobile terminal. The baseband module can convert to-be-transmitted signals through channel coding and interleaving, modulate the converted signals and provide the modulated signals to RF module. Also, the baseband module can demodulate and equalize signals provided from the RF module and can perform channel decoding and deinterleaving for the demodulated and equalized signals. Here, the baseband module was explained to be included in the controller 580, but the baseband module can be included the controller 580, the first wireless communication unit 510 and the second wireless communication unit 520, respectively, or can be implemented separate from the controller 580, the first wireless communication unit 510 and the second wireless communication unit 520.

Further, FIG. 5 illustrated an example of a schematic configuration of the mobile terminal for the convenience of illustration. However, the mobile terminal of the present invention is not limited to the above-described configuration.

Hence, the mobile terminal of the present invention may further include elements, which have not been mentioned above, such as a digital broadcasting reception module, an LAN communication module or an Internet communication module, depending on the provided type. Not all such elements can be listed here because the elements can be modified in various ways according to the convergence trend of digital devices, but it is possible for the elements on the same level as that of the above-mentioned elements to be further included in the mobile terminal. Also, the mobile terminal of the present invention may exclude a certain block from the above-mentioned configuration or a certain block may be substituted by another block, depending on the provided type, which can be easily understood by those skilled in the art.

As described above, according to a method and apparatus for providing an animation effect during a video telephony call of the present invention, a user can add and express various animation effects according to user's desire during a video telephony call. Particularly, user can add and express user's desired animation on at least one of user's video data taken by the camera module of a mobile terminal and the other party's video data received from the communication unit during a video telephony call.

Likewise, a mobile terminal can recognize the face of a user or the other party according to a user's request during a video telephony call, analyze the face state information, and adaptively provide an animation effect corresponding to the state information, which can arouse interest in use of a video telephony call.

Also, according to the present invention, a new service can be provided to a user according to use of a video telephony call because video data with various animation effects can be captured (still image or moving picture) in real time and can be stored in a mobile terminal or can be transmitted to other party's mobile terminal.

It would be understood that the techniques and processes disclosed herein may also be applicable to stationary telephone systems or cordless telephone systems that are connected to a wired telephone system.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A video telephony call method of a calling mobile terminal, the method comprising:
    setting an event execution outputting an event data during a video telephony call, wherein the event data comprises a feeling item and an accessory item;
    executing the event execution according to input of a function key;
    selecting an event mode comprising at least one of a selection mode and an application mode, wherein the selection mode is mode for designating a video data to which the event data is applied and the application mode is mode for selecting a part of the video data to which the event data is applied;
    performing a face recognition processing on the video data designated by the selection mode;
    obtaining a face state information of at least one of the user and another party by the face recognition processing;
    analyzing the obtained face state information by comparing the obtained face state information with a reference face state information;
    extracting the event data corresponding to the analyzed face state information; and
    outputting the extracted event data along with the video data.

2. The method of claim 1, wherein analyzing the obtained face state information comprises:
    extracting the reference face state information corresponding to the face state information; and
    obtaining the event data mapped to the reference face state information.

3. The method of claim 1, further comprising receiving an input of an event key from a plurality of event keys including:
    a first event key for a first event which identifies a face expression of video data and outputs event data according to the feeling item; and
    a second event key for a second event which identifies a face shape of video data and outputs event data according to the accessory item.

4. The method of claim 3, further comprising receiving an input of a predetermined event key including:
    a third event key for a third event which randomly outputs the arbitrary number of event data among all event data according to the feeling item and the accessory item.

5. The method of claim 3, further comprising:
    outputting event data of the feeling item on background data, when the first event key is inputted; and
    outputting event data of the accessory item on face data, when the second event key is inputted.

6. The method of claim 1, wherein outputting comprises:
    moving event data which is previously outputting and outputting the moved event data on a changed video data when sensing a change of the video data during outputting the event data on the video data; or
    extracting a new event data and outputting the new event data based on the changed video data.

7. The method of claim 1, further comprising capturing and storing video data which reflects the event data in a corresponding display area in response to a user's request, or transmitting the video data to an opponent's mobile terminal, during outputting the event data on the video data.

8. A mobile terminal that supports a video telephony call, comprising:
    an input unit that receives an inputted event key during the video telephony call;
    a wireless communication unit which forms a communication channel having a preset method with a mobile communication network which supports a video telephony call, and processes transmission and reception of data according to the video telephony call;
    a camera module which photographs an image of a user and outputs user video data associated for the photographed image during the video telephony call;
    a display unit which displays the user video data and an opponent's video data of an opponent mobile terminal user respectively on divided display areas during the video telephony call;
    a storage unit which stores event data classified into a feeling item and an accessory item and various setting information of an event mode; and
    a controller which controls a face recognition processing for at least one video data obtained during the video telephony call, that is responsive to the inputted event key for determining a kind of the inputted event key from a plurality of event keys, including determining whether a predetermined event key is inputted, and that controls an output of specific event data on a corresponding video data according to the inputted event key and a face state information of at least one of the calling mobile terminal user or a called opponent mobile terminal user by the face recognition processing, including being responsive to the input of the predetermined event key to randomly output an arbitrary number of event data among all event data on the video data.

9. The mobile terminal of claim 8, wherein the controller comprises:
    an event processing unit which processes an event; and
    a face state recognition unit which performs the face recognition processing for at least one of the user video data and the opponent video data in response to the event modes.

10. The mobile terminal of claim 9, wherein the controller determines video data for the face recognition processing according to setting information of selection mode among the event modes.

11. The mobile terminal of claim 10, wherein the controller:
obtains face state information of video data from the face recognition processing;
extracts reference state information corresponding to the obtained face state information;
extracts event data mapped to the reference face state information;
analyzes the obtained face state information by comparing with the reference face state information; and
provides the event data corresponding to the analyzed result on the video data.

12. The mobile terminal of claim 11, wherein the controller provides the event data on at least one partial video data of face data which indicates a face portion of a user in the video data, and background data which indicates a background portion in the video data, according to setting information of application mode among the event modes.

13. The mobile terminal of claim 9, wherein:
the input unit transmits a signal inputted in connection with a function control of the mobile terminal to the controller, wherein the input unit further comprises:
a function key for executing the event during a video telephony call; and
wherein the plurality of event keys further includes:
a first event key for a first event which outputs event data according to a feeling item by identifying a face expression within the video data; and
a second event key for a second event which outputs event data according to an accessory item by identifying a face shape within the video data.

14. The mobile terminal of claim 13, wherein the input unit further comprises: the predetermined event key as a third event key for a third event which randomly outputs the arbitrary number of event data among all event data according to the feeling item and the accessory item.

15. The mobile terminal of claim 14, wherein the controller outputs event data of the feeling item on background data when the first event key is inputted, and outputs event data of the accessory item on face data when the second event key is inputted.

16. The mobile terminal of claim 10, wherein the controller moves event data which is previously outputting and outputs the moved event data on a changed video data when sensing the change of the video data, and extracts new event data and outputs the new event data based on the changed video data.

17. The mobile terminal of claim 10, wherein the controller, during outputting the event data on the video data, captures and stores video data which reflects the event data in a corresponding display area in response to user's request, or transmits the video data to an opponent's mobile terminal.

18. The mobile terminal of claim 9, wherein the storage unit comprises:
a setting information storage area which stores setting information on selection mode and application mode according to the event modes; and
a data storage area which stores the event data and basic state information.

19. The method of claim 1, further comprising:
selecting a selection mode or application mode through the execution of the event from the user.

20. The method of claim 19, further comprising:
partitioning a display area in which video data are displayed in accordance to the selected of the selection mode or application mode.

21. The method of claim 20, wherein providing the event data comprising:
outputting the event data on the video data comprised at least one of a user video data, other party video data, and all of the video data in accordance to the selection mode.

22. The method of claim 20, wherein providing the event data comprising:
outputting the event data on the video data comprised at least one of face data which indicates a face portion of the user in the video data, background data which indicates a background portion excluding the face data in the video data, and all partial video data.

23. The method of claim 1, wherein the face state information includes information regarding at least one of eyes, nose, mouth, lip shape, ear, philtrum, brow, and face shape.

24. The method of claim 2, wherein the reference face state information is previously stored.

25. The method of claim 1, wherein the event key is at least one of feeling item, an accessory item, and an animation effect.

26. The method of claim 1, wherein the event execution is outputting an event data along with a video data of the video telephony call.

27. The method of claim 1, wherein the part of the video data comprises at least one of face data and background data.

* * * * *